United States Patent
Zhang et al.

(10) Patent No.: US 11,710,259 B2
(45) Date of Patent: Jul. 25, 2023

(54) PREDICTIVE TREE CODING FOR POINT CLOUD CODING

(71) Applicant: TENCENT AMERICA LLC, Palo Alto, CA (US)

(72) Inventors: Xiang Zhang, Palo Alto, CA (US); Wen Gao, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 191 days.

(21) Appl. No.: 17/097,803

(22) Filed: Nov. 13, 2020

(65) Prior Publication Data

US 2021/0248785 A1 Aug. 12, 2021

Related U.S. Application Data

(60) Provisional application No. 62/972,156, filed on Feb. 10, 2020.

(51) Int. Cl.
| | | |
|---|---|---|
| *G06T 3/40* | (2006.01) | |
| *G06T 9/40* | (2006.01) | |
| *H04N 19/96* | (2014.01) | |
| *H04N 19/625* | (2014.01) | |
| *H04N 19/17* | (2014.01) | |
| *H04N 19/119* | (2014.01) | |
| *H04N 19/70* | (2014.01) | |
| *H04N 19/169* | (2014.01) | |
| *H04N 19/46* | (2014.01) | |

(52) U.S. Cl.
CPC .................. *G06T 9/40* (2013.01); *G06T 3/40* (2013.01); *H04N 19/119* (2014.11); *H04N 19/17* (2014.11); *H04N 19/1883* (2014.11); *H04N 19/46* (2014.11); *H04N 19/625* (2014.11); *H04N 19/70* (2014.11); *H04N 19/96* (2014.11)

(58) Field of Classification Search
CPC . G06T 9/40; G06T 3/40; H04N 19/96; H04N 9/625; H04N 19/46; H04N 19/119; H04N 19/70; H04N 19/169; H04N 19/17
See application file for complete search history.

(56) References Cited

U.S. PATENT DOCUMENTS

2021/0209812 A1* 7/2021 Han ................... H04N 19/64
2021/0217206 A1* 7/2021 Flynn ................ H04N 19/167

OTHER PUBLICATIONS

"Coding of Moving Pictures and Audio", ISO/IEC JTC1/SC29/WG11 N18673, Jul. 2019, Gothenburg, SE, 62pages.
"Information technology—MPEG-I (Coded Representation of Immersive Media)—Part 9: Geometry-based Point Cloud Compression", ISO/IEC 2019, ISO/IEC JTC 1/SC29/WG 11, 104pages.

(Continued)

*Primary Examiner* — Dave Czekaj
*Assistant Examiner* — Berteau Joisil
(74) *Attorney, Agent, or Firm* — Sughrue Mion, PLLC

(57) ABSTRACT

A method and device for decoding a point cloud using octree partitioning and a predictive tree include obtaining the point cloud. A bounding box of the point cloud is determined. Octree nodes are generated by partitioning the bounding box using octree partitioning. The predictive tree is generated for points in at least one octree node of the octree nodes. A transform is applied to the predictive tree. The points in the at least one octree node are decoded using the predictive tree.

18 Claims, 6 Drawing Sheets

(56) References Cited

OTHER PUBLICATIONS

Christian Tulvan et al., "Use Cases for Point Cloud Compression (PCC)", ISO/IEC JTC1/SC29/WG11 MPEG2015/ N16331, Jun. 2016, Geneva, CH, 8pages.
Rufael Mekuria et al., "Requirements for Point Cloud Compression", ISO/IEC JTC1/SC29/WG11 MPEG2016/n16330, Feb. 2016, Geneva, CH, 3pages.
Stefan Gumhold et al., "Predictive Point-Cloud Compression", 1page.

* cited by examiner

PREDICTIVE TREE CODING FOR POINT CLOUD CODING

CROSS-REFERENCE TO RELATED APPLICATION(S)

This application is based on and claims priority under 35 U.S.C. § 119 to U.S. Provisional Patent Application No. 62/972,156, filed on Feb. 10, 2020, in the U.S. Patent & Trademark Office, the disclosure of which is incorporated by reference herein in its entirety.

BACKGROUND

Point clouds are widely used, and have many applications. For example, a point cloud may be used in autonomous driving vehicles for object detection and localization, may be used in geographic information systems (GIS) for mapping, and may be used in cultural heritage applications to visualize and archive cultural heritage objects and collections, etc.

Point clouds contain a set of high dimensional points, typically three dimensional (3D), each including 3D position information and additional attributes such as color, reflectance, etc. Point clouds can be captured using multiple cameras and depth sensors, or Lidar in various setups, and may be made up of thousands up to billions of points to realistically represent the original scenes.

Compression technologies may reduce the amount of data required to represent a point cloud for faster transmission or reduction of storage. ISO/IEC MPEG (JTC 1/SC 29/WG 11) has created an ad-hoc group (MPEG-PCC) to standardize the compression techniques for static or dynamic cloud.

SUMMARY

The present disclosure is directed to Point Cloud Coding (PCC). In the present disclosure, predictive tree based coding methods are elaborated for point cloud coding purposes. A predictive tree can be built where the geometry and attributes of current node can be predicted from its parent node, grandparent node, and coded sibling nodes. The prediction residuals can be further processed by applying transform-based methods, where the transform basis can be derived from the predictive tree structure. The prediction residuals or transform coefficients can then be entropy coded.

According to some possible implementations, a method for decoding a point cloud using octree partitioning and a predictive tree by at least one processor may include obtaining the point cloud; determining a bounding box of the point cloud; generating octree nodes by partitioning the bounding box using octree partitioning; generating the predictive tree for points in at least one octree node of the octree nodes; applying a transform to the predictive tree; and decoding the points in the at least one octree node using the predictive tree According to some possible implementations, a device for decoding a point cloud using octree partitioning and a predictive tree may include at least one memory configured to store program code; and at least one processor configured to read the program code and operate as instructed by the program code, the program code including: obtaining code configured to cause the at least one processor to obtain the point cloud; determining code configured to cause the at least one processor to determine a bounding box of the point cloud; generating code configured to cause the at least one processor to generate octree nodes by partitioning the bounding box using octree partitioning, and generate the predictive tree for points in at least one octree node of the octree nodes; applying code configured to cause the at least one processor to apply a transform to the predictive tree; and decoding code configured to cause the at least one processor to decode the points in the at least one octree node using the predictive tree.

According to some possible implementations, a non-transitory computer-readable medium may store instructions that, when executed by one or more processors of a device for decoding a point cloud using octree partitioning and a predictive tree, cause the one or more processors to: obtain the point cloud; determine a bounding box of the point cloud; generate octree nodes by partitioning the bounding box using octree partitioning; generate the predictive tree for points in at least one octree node of the octree nodes; apply a transform to the predictive tree; and decode the points in the at least one octree node using the predictive tree.

DETAILED DESCRIPTION

In the TMC13 model, the geometry information and the associated attributes, such as color or reflectance, are separately compressed. The geometry information, which is the 3D coordinates of the point cloud, is coded by octree-partition with its occupancy information. The attributes are then compressed based on reconstructed geometry using prediction, lifting and region adaptive hierarchical transform techniques.

Figure 1A:
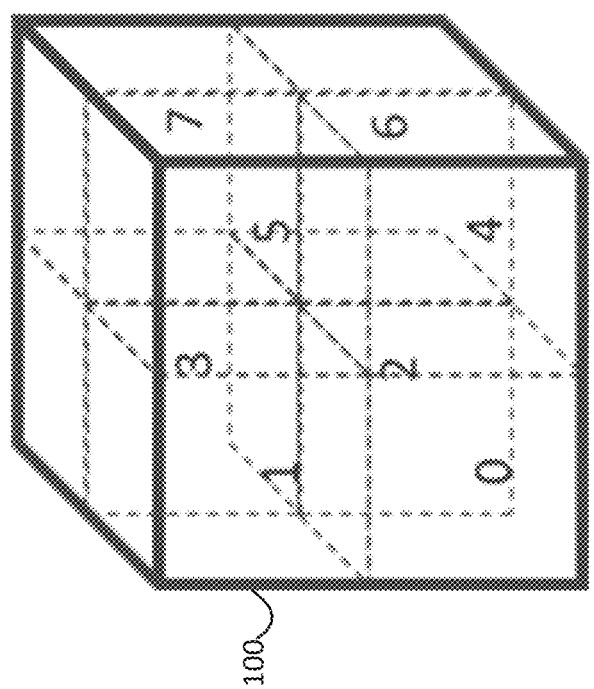
FIG. 1A is a diagram of an octree-partition in 3D space.

In TMC13, if the octree geometry codec is used, the geometry encoding proceeds as follows. First, as shown in FIG. 1A, a cubical axis-aligned bounding box B 100 is defined by two points $(0,0,0)$ and $(2^{M-1}, 2^{M-1}, 2^{M-1})$, where $2^{M-1}$ defines the size of B and M is specified in the bitstream.

An octree structure is then built by recursively subdividing B. At each stage, a cube is subdivided into 8 sub-cubes. An 8-bit code, namely the occupancy code, is then generated by associating a 1-bit value with each sub-cube to indicate whether it contains points (i.e., full and has value 1) or not (i.e., empty and has value 0). Only full sub-cubes with a size greater than 1 (i.e., non-voxels) are further subdivided.

Figure 1B:
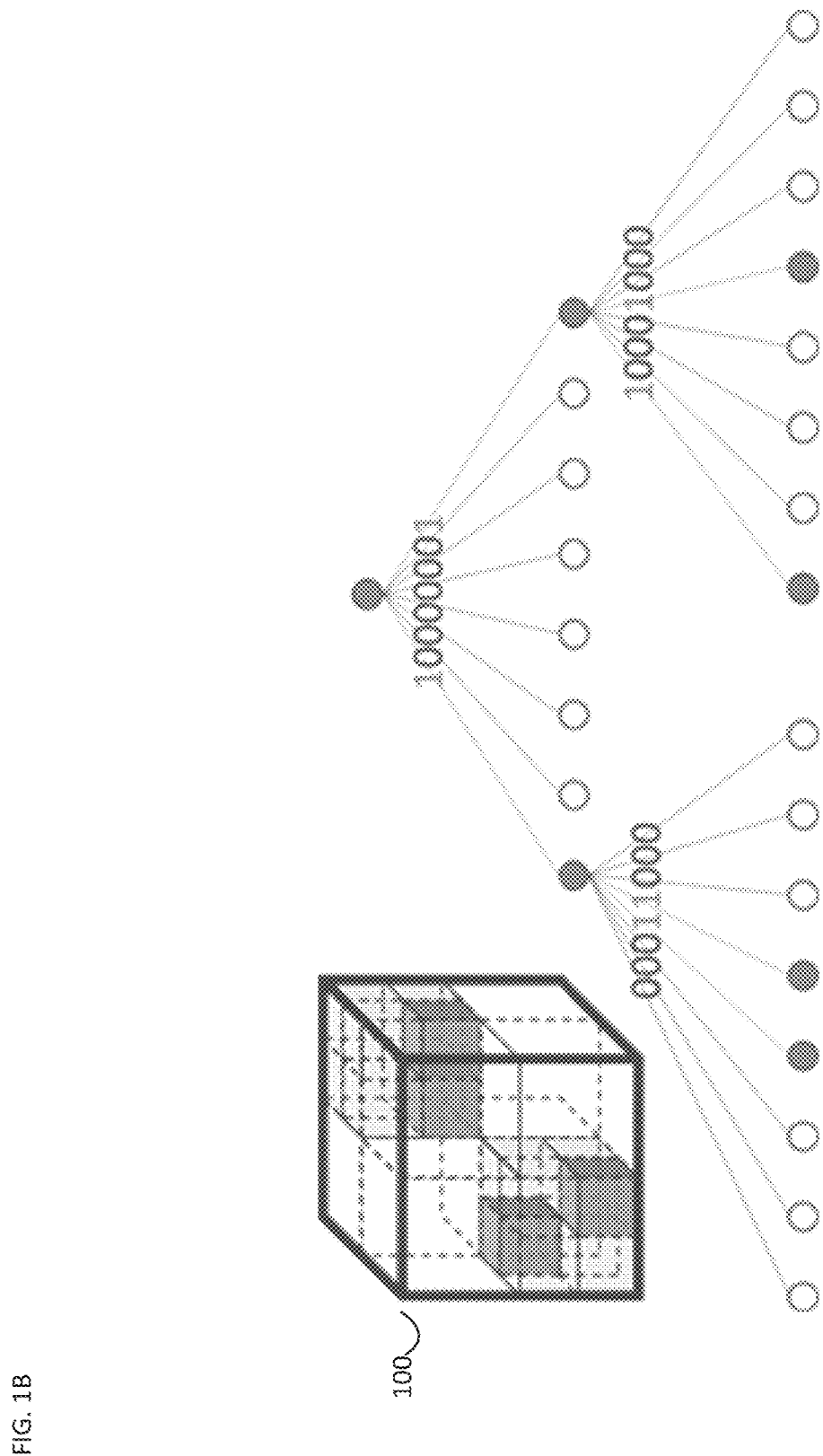
FIG. 1B is a diagram of an octree partition and tree structure.

An example of two-level octree partition and the corresponding occupancy code are shown in FIG. 1B, where cubes and nodes in dark indicate they are occupied by points.

The occupancy code of each node is then compressed by an arithmetic encoder. The occupancy code can be denoted as S which is an 8-bit integer, and each bit in S indicates the occupancy status of the corresponding child node. Two encoding methods for occupancy code exist in TMC13, i.e., the bit-wise encoding and the byte-wise encoding methods, and the bit-wise encoding is enabled by default. In both approaches, arithmetic coding with context modeling is adopted to encode the occupancy code, where the context status is initialized at the beginning of the whole coding process and is updated during the coding process.

For bit-wise encoding, eight bins in S are encoded in a certain order where each bin is encoded by referring to the occupancy status of neighboring nodes and child nodes of neighboring nodes, where the neighboring nodes are in the same level of the current node.

For byte-wise encoding, S is encoded by referring to an adaptive look up table (A-LUT), which keeps track of the N (e.g., 32) most frequent occupancy codes, and a cache which keeps track of the last different observed M (e.g., 16) occupancy codes.

A binary flag indicating whether S is the A-LUT or not is encoded. If S is in the A-LUT, the index in the A-LUT is encoded by using a binary arithmetic encoder. If S is not in the A-LUT, then a binary flag indicating whether S is in the cache or not is encoded. If S is in the cache, then the binary representation of its index is encoded by using a binary arithmetic encoder. Otherwise, if S is not in the cache, then the binary representation of S is encoded by using a binary arithmetic encoder.

The decoding process starts by parsing the dimensions of the bounding box B from bitstream. The same octree structure is then built by subdividing B according to the decoded occupancy codes.

In current TMC13 design, the geometry coding and attribute coding are separate, and the geometry is coded by performing octree partitioning of the 3D bounding box. In early publication, the predictive tree based methods were proposed, which can achieve lower latency and higher coding efficiency in some scenarios.

Figure 2:
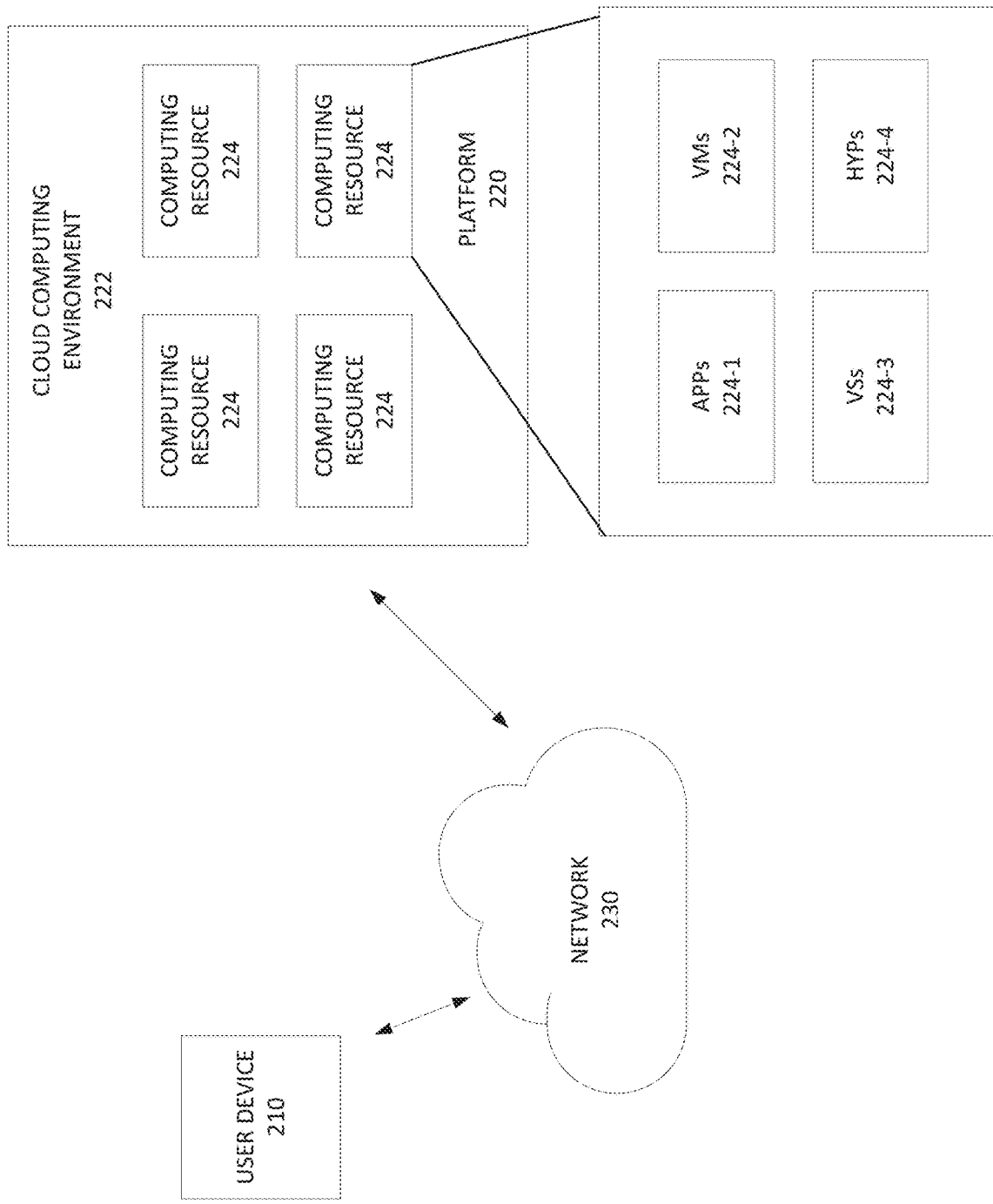
FIG. 2 is a diagram of an example environment in which systems and/or methods, described herein, may be implemented.

FIG. 2 is a diagram of an example communication system 200 in which systems and/or methods, described herein, may be implemented. As shown in FIG. 2, communication system 200 may include a user device 210, a platform 220, and a network 230. Devices of communication system 200 may interconnect via wired connections, wireless connections, or a combination of wired and wireless connections.

The communication system 200 may support unidirectional transmission of data. For example, a first user device 210 may code video data at a local location for transmission to a second user device 210 via the network 230. The second user device 210 may receive the coded video data of the first user device 210 from the network 230, decode the coded data and display the recovered video data. Unidirectional data transmission may be common in media serving applications, and the like.

The communication system 200 may support bidirectional transmission of data. For example, the communication system 200 may support bidirectional transmission of coded video that may occur, for example, during videoconferencing. For bidirectional transmission of data, each user device 210 may code video data captured at a local location for transmission to the other user device 210 via the network 230. Each user device 210 also may receive the coded video data transmitted by the other user device 210, may decode the coded data and may display the recovered video data at a local display device.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of providing information to user device 210, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
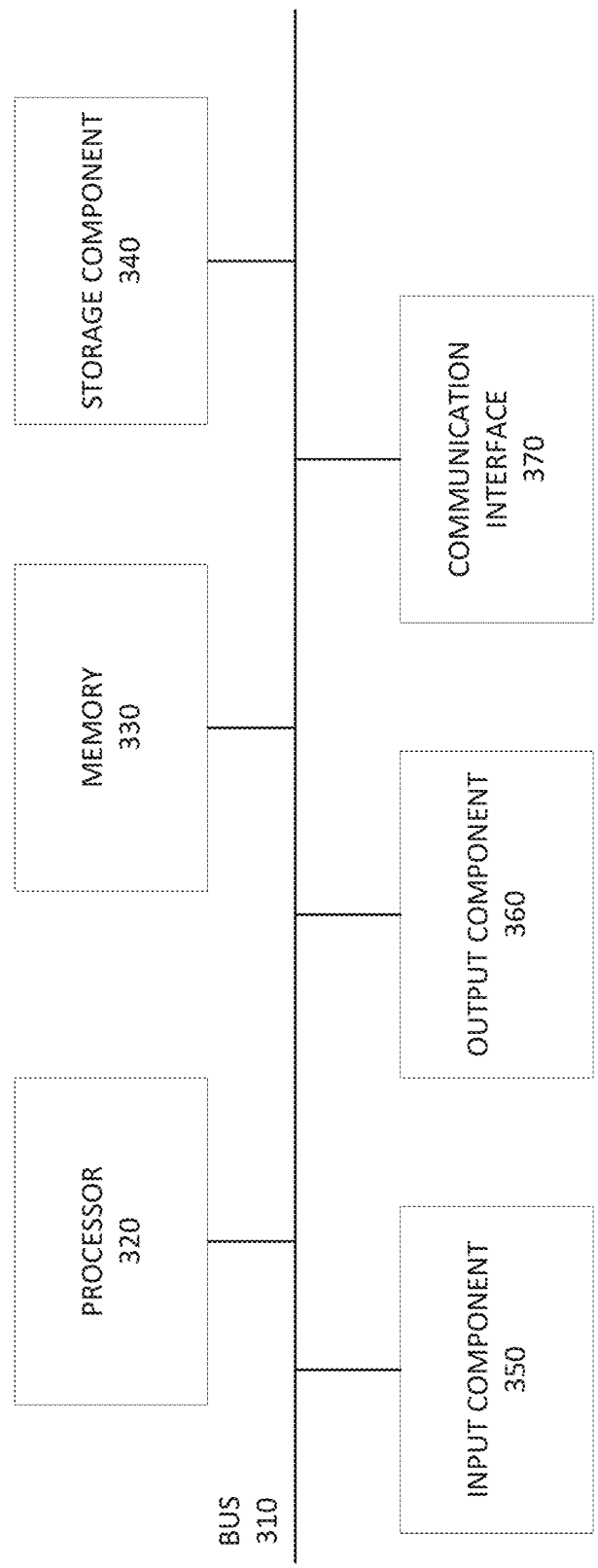
FIG. 3 is a diagram of example components of one or more devices of FIG. 2.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device

300 may perform one or more functions described as being performed by another set of components of device 300.

Figure 4:
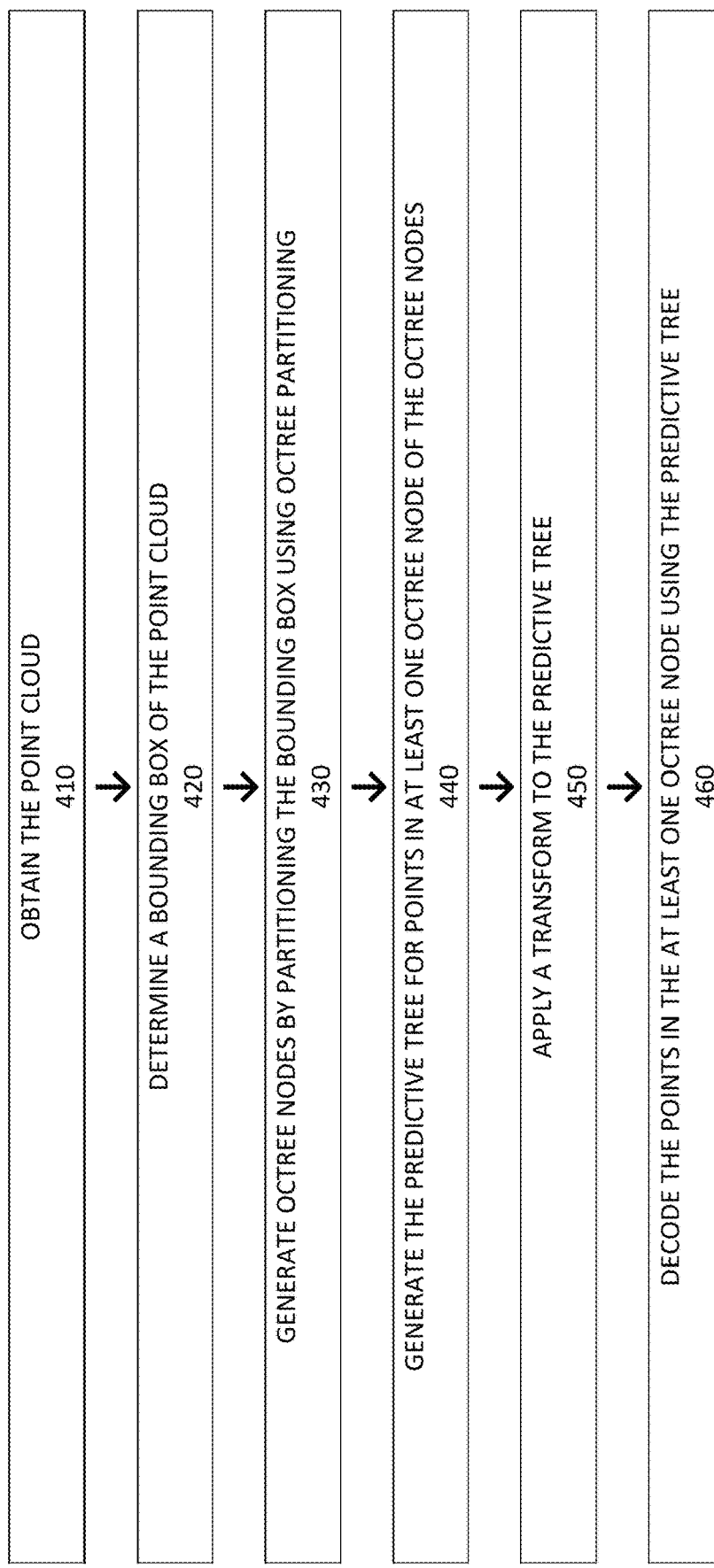
FIG. 4 is a flow chart of an example process for decoding a point cloud using octree partitioning and a predictive tree.

FIG. 4 is a flow chart of an example process for decoding a point cloud using octree partitioning and a predictive tree. In some implementations, one or more process blocks of FIG. 4 may be performed by platform 220. In some implementations, one or more process blocks of FIG. 4 may be performed by another device or a group of devices separate from or including platform 220, such as user device 210.

As shown in FIG. 4, the process may include obtaining the point cloud (operation 410), determining a bounding box of the point cloud (operation 420), generating octree nodes by partitioning the bounding box using octree partitioning (operation 430), generating the predictive tree for points in at least one octree node of the octree nodes (operation 440), applying a transform to the predictive tree (operation 450), and decoding the points in the at least one octree node using the predictive tree (operation 460).

According to an embodiment, the process may include identifying a flag that specifies that the points in the at least one octree node are coded using predictive tree coding; and generating the predictive tree for the points in the at least one octree node, based on identifying the flag.

According to an embodiment, the process may include determining that an octree partition depth of the bounding box satisfies a threshold; and generating the predictive tree for the points in the at least one octree node, based on determining that the octree partition depth of the bounding box satisfies the threshold. According to an embodiment, the threshold is predefined. Alternatively, the threshold is signaled in a high-level syntax.

According to an embodiment, the process may include generating the predictive tree using geometry information and attribute information of the points.

According to an embodiment, the process may include preventing octree partitioning of the at least one node, based on generating the predictive tree.

According to an embodiment, the predictive tree can be constructed for all points in a point cloud or can be constructed for a subset of a point cloud.

In an embodiment, the predictive tree is constructed for the points within an octree node. A flag may be specified for each octree node to indicate if the node is coded by predictive tree. If yes, the points in this node are coded by predictive tree, and the further octree partition is terminated. Otherwise, the octree partition is performed, and the occupancy code is coded. A rate-distortion optimization process may be conducted to determine if current node uses predictive tree or octree.

In another embodiment, the predictive tree is enabled when the octree partition depth reaches a certain threshold. The threshold can be predefined or signaled in the high-level syntax.

In another embodiment, the predictive tree is enabled only when certain conditions are met. Otherwise, the octree coding is performed.

To construct a predictive tree, the geometry structure and attribute information may be utilized. Typically, during the tree construction process, two points are connected if they are found to be close to each other. The distance of two points can be measured by different metrics:

In an embodiment, the distance of two points is defined as the geometry distance between them. The geometry distance can be calculated by $\ell_1$ or $\ell_2$ norm or any other distance measurement.

In another embodiment, the distance of two points can be defined as a metric including both geometry and attribute differences as follows:

$$D(p_1,p_2)=\|x_1-x_2\|+\beta\|a_1-a_2\|$$

As shown above, $p_1$ and $p_2$ are two points in 3D, and $x_i$ and $a_i$ are their 3D geometry positions and attribute vectors. $\beta$ is a weighting factor that changes the relative importance between geometry and attribute.

In another embodiment, if a set of points are detected to be located close to a straight line, they can be connected to form a branch of the predictive tree.

The predictive tree can be traversed by either depth-first or breadth-first order. All the coded nodes before current node can be utilized to provide a prediction for current node. A typical prediction structure in the predictive tree is shown in FIG. 3.

To provide multiple predictions for current node, a candidate list can be constructed, the candidates may include the predictions as follows:

The prediction from the parent node of current node, i.e., pred=p.

The prediction from the grandparent node of current node, i.e., pred=g.

The prediction from the linear combination of parent node and grandparent node, i.e., pred=ap+bg, where a and b are coefficients that scale parent node and grandparent node. For example, pred=2p−g, $$pred = \frac{1}{2}p + \frac{1}{2}g.$$

The prediction from the linear combination of parent node, grandparent node and the grand grandparent node, i.e., pred=ap+bg+cx, where a, b and c are coefficients that scale the three precedent nodes. For example, pred=p+g−x, $$pred = \frac{3}{2}p - \frac{1}{2}x.$$

The prediction from the coded sibling nodes, i.e., pred=$s_i$. If there are multiple siblings, the prediction can be a linear combination of these siblings, for example the average value of the siblings.

The prediction from the linear combination of sibling nodes and parent nodes. For example, $$pred = \frac{1}{2}s_i + \frac{1}{2}p.$$

Figure 5:
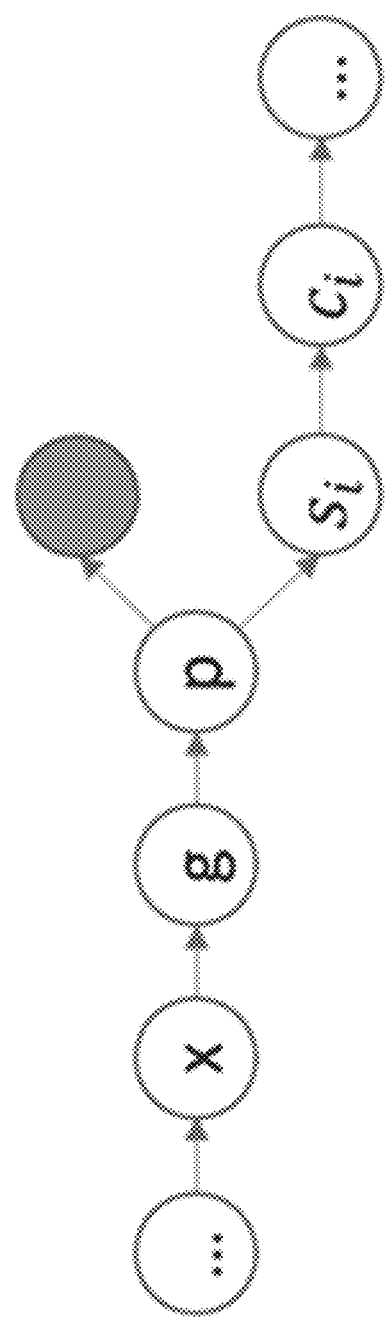
FIG. 5 is a diagram of a prediction structure in a predictive tree.

The prediction from coded child nodes of sibling nodes, i.e., the node Ci in FIG. 5. This mode is applicable if the predictive tree is traversed by depth-first order.

The construction of the candidate list can be performed by checking the possible candidates one by one in a predefined order. If the prediction value is not in the list yet, it is then added to the end of the list. This process ends when the candidate list is full.

After then, the best prediction is selected from the list by choosing the one that minimizes the rate-distortion cost. The best prediction is specified by the index to the candidate list.

The prediction can be applied to both the geometry and attribute of the points. Geometry and attribute may construct their own candidate list and the prediction index may be signaled separately as well.

The prediction residual can be directly signaled. Alternatively, transforms can be conducted to the prediction residuals.

In one embodiment, 3D positions can be mapped into 2D or 1D positions. Then, the traditional 2D and 1D transforms such as discrete cosine transform (DCT), discrete sine transform (DST) or discrete wavelet transform (DWT) can be applied. The mapping from 3D space to lower dimension space can be guided by the predictive tree structure.

In another embodiment, the graph-based transform can be applied to the derived predictive tree, where the tree structure can be used as the graph in calculating the graph transform basis.

In another embodiment, the region adaptive hierarchical transform (RAHT) can be applied to the derived predictive tree, where a Haar transform can be applied to each edge of the predictive tree.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for decoding a point cloud using octree partitioning and a predictive tree by at least one processor, the method comprising:
   obtaining the point cloud;
   determining a bounding box of the point cloud;
   generating octree nodes by partitioning the bounding box using octree partitioning;
   determining whether to enable the predictive tree based on determining whether an octree partition depth of the bounding box satisfies a threshold by comparing the octree partition depth to the threshold;
   based on determining that the octree partition depth of the bounding box satisfies the threshold by comparing the octree partition depth to the threshold, generating the predictive tree for points in at least one octree node of the octree nodes;
   applying a transform to the predictive tree; and
   decoding the points in the at least one octree node using the predictive tree.

2. The method of claim 1, further comprising:
   identifying a flag that specifies that the points in the at least one octree node are coded using predictive tree coding; and
   generating the predictive tree for the points in the at least one octree node, based on identifying the flag.

3. The method of claim 1, wherein the threshold is predefined.

4. The method of claim 1, wherein the threshold is signaled in a high-level syntax.

5. The method of claim 1, further comprising:
   generating the predictive tree using geometry information and attribute information of the points.

6. The method of claim 1, further comprising:
   preventing octree partitioning of the at least one node, based on generating the predictive tree.

7. The method of claim 1, wherein the transform is a discrete cosine transform (DCT).

8. The method of claim 1, wherein the transform is a discrete sine transform (DST).

9. The method of claim 1, wherein the transform is a discrete wavelet transform (DWT).

10. The method of claim 1, wherein the transform is a graph-based transform.

11. The method of claim 1, wherein the transform is a region adaptive hierarchical transform (RAHT).

12. A device for decoding a point cloud using octree partitioning and a predictive tree, the device comprising:
    at least one memory configured to store program code; and
    at least one processor configured to read the program code and operate as instructed by the program code, the program code including:
    obtaining code configured to cause the at least one processor to obtain the point cloud;
    first determining code configured to cause the at least one processor to determine a bounding box of the point cloud;
    first generating code configured to cause the at least one processor to generate octree nodes by partitioning the bounding box using octree partitioning;
    second determining code configured to cause the at least one processor to determine whether to enable the predictive tree based on determining whether an octree partition depth of the bounding box satisfies a threshold by comparing the octree partition depth to the threshold;

second generating code configured to cause the at least one processor to, based on determining that the octree partition depth of the bounding box satisfies the threshold by comparing the octree partition depth to the threshold, generate the predictive tree for points in at least one octree node of the octree nodes applying code configured to cause the at least one processor to apply a transform to the predictive tree; and decoding code configured to cause the at least one processor to decode the points in the at least one octree node using the predictive tree.

13. The device of claim 12, further comprising:
identifying code configured to cause the at least one processor to identify a flag that specifies that the points in the at least one octree node are coded using predictive tree coding,
wherein the generating code is configured to cause the at least one processor to generate the predictive tree for the points in the at least one octree node, based on identifying the flag.

14. The device of claim 12, wherein the threshold is predefined.

15. The device of claim 12, wherein the threshold is signaled in a high-level syntax.

16. The device of claim 12, wherein the generating code is configured to cause the at least one processor generate the predictive tree using geometry information and attribute information of the points.

17. The device of claim 12, wherein the transform is at least one of a discrete cosine transform (DCT), a discrete sine transform (DST), a discrete wavelet transform (DWT), a graph-based transform, or a region adaptive hierarchical transform (RAHT).

18. A non-transitory computer-readable medium storing instructions, the instructions comprising: one or more instructions that, when executed by one or more processors of a device for decoding a point cloud using octree partitioning and a predictive tree, cause the one or more processors to:

obtain the point cloud;

determine a bounding box of the point cloud;

generate octree nodes by partitioning the bounding box using octree partitioning;

determine whether to enable the predictive tree based on determining whether an octree partition depth of the bounding box satisfies a threshold by comparing the octree partition depth to the threshold;

based on determining that the octree partition depth of the bounding box satisfies the threshold by comparing the octree partition depth to the threshold, generate the predictive tree for points in at least one octree node of the octree nodes;

apply a transform to the predictive tree; and decode the points in the at least one octree node using the predictive tree.

* * * * *